Sept. 9, 1941.     L. W. JENKINS     2,255,466
ELECTRICAL APPLIANCE
Filed June 28, 1940

Inventor
Louis W. Jenkins

By Clarence A. O'Brien

Attorney

Patented Sept. 9, 1941

2,255,466

UNITED STATES PATENT OFFICE 2,255,466

ELECTRICAL APPLIANCE

Louis W. Jenkins, West Branch, Mich.

Application June 28, 1940, Serial No. 343,026

1 Claim. (Cl. 219—19)

The present invention relates to new and useful improvements in electrical appliances and has for its primary object to provide, in a manner as hereinafter set forth, novel means for browning pastry frostings, warming cold meats, toasting bread, etc.

Another very important object of the invention is to provide an electrical appliance of the aforementioned character which may be expeditiously adjusted as desired.

Still another important object of the invention is to provide an electrical appliance of the character described which may be conveniently moved from place to place.

Other objects of the invention are to provide an electrical appliance of the character set forth which will be comparatively simple in construction, strong, durable, highly efficient and reliable in use, compact, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
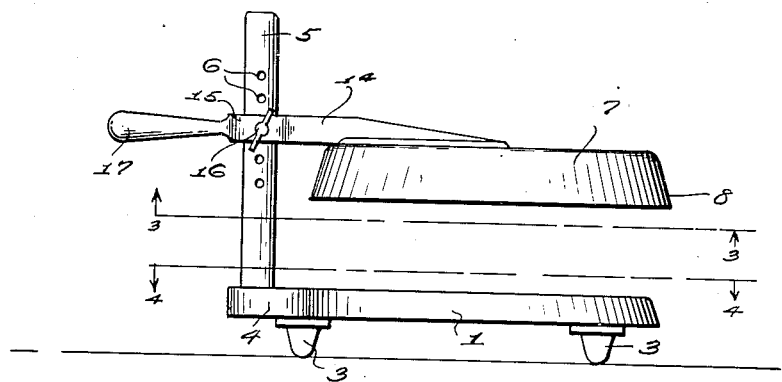
Figures 1 is a view in side elevation of an electrical appliance constructed in accordance with the present invention.
Figure 2:
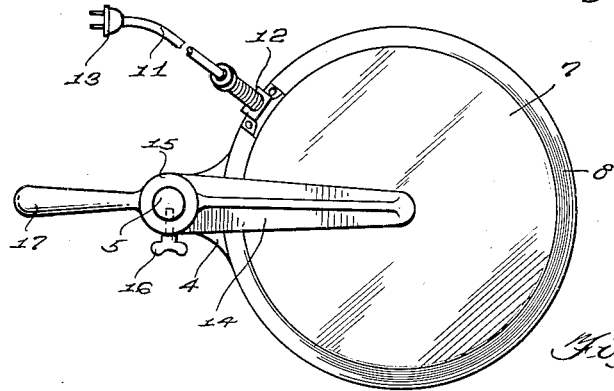
Figure 2 is a top plan view thereof.
Figure 3:
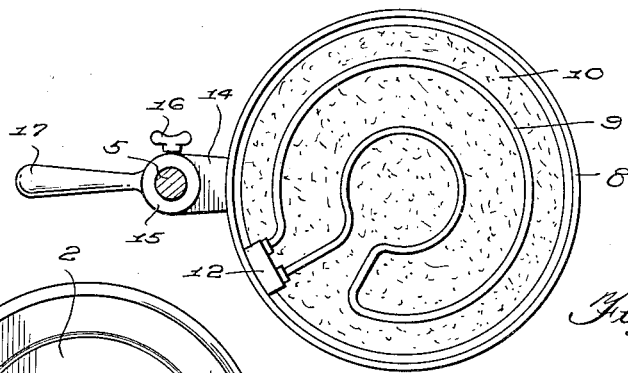
Figure 3 is a view in horizontal section, taken substantially on the line 3—3 of Fig. 1, looking upwardly.
Figure 4:
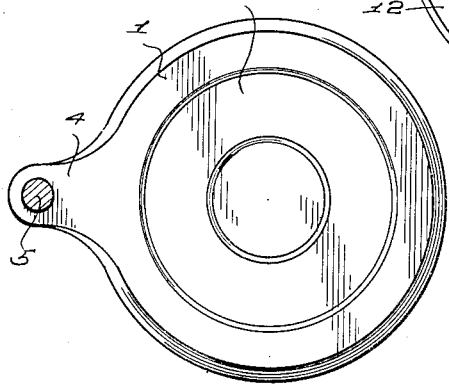
Figure 4 is a view in horizontal section, taken substantially on the line 4—4 of Fig. 1, looking downwardly.

Referring now to the drawing in detail, it will be seen that the embodiment of the invention which has been illustrated comprises a base 1 of suitable material, said base being circular in plan. The base 1 has formed therein an annular groove or channel 2. Suitable supporting legs or feet 3 are provided beneath the base 1.

Projecting from the periphery of the base 1 is an arm 4. The reference numeral 5 designates a post which rises from the arm 4, said post having a series of spaced openings 6 therein.

The reference numeral 7 designates a plate of suitable material comprising a depending peripheral flange or skirt 8. It will be observed that the plate 7 is mounted above the base 1. Mounted beneath the plate 7 within the skirt 8 thereof is an electric heating element 9. A heat resisting lining 10 of asbestos or other suitable material is provided between the element 9 and the plate 7. An insulated cord 11 is electrically connected to the element 9 at 12. The free end of the cord 11 is provided with a plug 13 for insertion in an electric receptacle.

Fixed on the plate 7 is a horizontally projecting arm 14. The arm 14 is formed to provide an eye or opening 15 which slidably receives the post 5. A thumb screw 16 is provided on the arm 14 for engagement selectively in the openings 6 for securing the plate 7 in vertically adjusted position. Projecting from the outer end of the arm 14 is a handle 17.

It is thought that the manner of using the device will be readily apparent from a consideration of the foregoing. Briefly, the product to be treated is mounted on the base 1 and the plate 7 is adjusted vertically relative thereto as desired. Of course, adjustment of the plate 7 is accomplished by loosening the thumb screw 16 and sliding the arm 14 upwardly or downwardly on the post 5, after which said thumb screw is again tightened in one of the openings 6. The electric element 9 is now energized for rapidly heating or warming the product resting on the base 1.

It is believed that the many advantages of an electrical appliance constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

An electrical appliance of the class described comprising a base, a post rising from said base and having a series of vertically spaced openings therein, an eye slidably and rotatably mounted on said post, an integral arm projecting from said eye, a plate mounted on said arm, an electric heating element mounted beneath said plate, a handle projecting from the diametrically opposite side of the eye and longitudinally aligned with the arm, and a thumb screw threadedly mounted in the eye and engageable selectively in the openings for releasably securing said eye in vertically adjusted position and against rotation on the post with the plate over the base.

LOUIS W. JENKINS.